United States Patent [19]

Lejeune et al.

[11] Patent Number: 4,772,774
[45] Date of Patent: Sep. 20, 1988

[54] LASER TRIMMING OF ELECTRICAL COMPONENTS

[75] Inventors: Philippe G. Lejeune; Bernard E. Lejeune, both of Les Granges, France

[73] Assignee: Teradyne, Inc., Boston, Mass.

[21] Appl. No.: 57,428

[22] Filed: Jun. 2, 1987

[51] Int. Cl.[4] ............................................. B23K 26/00
[52] U.S. Cl. ............................ 219/121.69; 29/610.1; 338/195
[58] Field of Search ................ 219/121 LH, 121 LJ; 29/610 R; 338/195

[56] References Cited

U.S. PATENT DOCUMENTS

| | | | |
|---|---|---|---|
| 4,184,062 | 1/1980 | Schmidt | 219/121 LJ X |
| 4,381,441 | 4/1983 | Desmarais et al. | 219/121 LJ |
| 4,403,133 | 9/1983 | Turner et al. | 219/121 LJ |

*Primary Examiner*—C. L. Albritton

[57] ABSTRACT

A method of laser trimming an electronic component to achieve a desired electronic characteristic including entering into a controller the desired value of the characteristic of the component being trimmed, measuring the beginning value of the characteristic of the component being trimmed, determining the value of the length of a first leg of cut of the component by reference to information based upon cuts of legs of different lengths of a component of the same geometry as the component being trimmed, and cutting the component being trimmed using the laser to obtain the first leg of the cut.

12 Claims, 6 Drawing Sheets

METHOD OF DETERMINING CL VERSUS PRETEST COEFFICIENTS

LASER TRIMMING OF ELECTRICAL COMPONENTS

FIELD OF THE INVENTION

The invention relates to laser trimming of electrical components.

BACKGROUND OF THE INVENTION

Resistors made of resistor material supported on a substrate and having electrodes at two ends of the material are trimmed by lasers to precisely remove material between the electrodes so as to achieve the desired resistance for the resistor. By removing material, the flow of electricity is impeded, thereby increasing resistance. The trimming can involve a plunge cut (a single slice extending from one side into the material transverse to the direction between electrodes), an L-cut (two legs, one extending in from a side transverse to the direction between electrodes and one parallel to the direction), a U-cut (three legs, two extending from a side and transverse to the direction and one parallel to it), or a scan cut (repetitive overlapping cuts that remove a large portion of material).

U-cuts are desirable for some applications because they do not have the termination points of plunge and L-cuts (which in general disrupt electron flow and can permit arcing, e.g., when used in lightening arresters), are quicker than scan cuts and do not have thermal stresses associated with scan cuts. Achieving precise resistance with U-cuts has often involved operating in a repetitive start/stop/measure mode, which involves noncontinuous trimming that can result in microcracking. One method of avoiding the stopping of the laser has been to make several overlapping U-cuts, successive U-cuts having longer first and third legs and shorter second legs.

SUMMARY OF THE INVENTION

It has been discovered that laser trimming of an electronic component (e.g., a resistor) can be desirably controlled by determining the value of the length of a leg of a cut of the component by reference to information based upon cuts of legs of different lengths of a component or components of the same geometry as the component being trimmed.

In preferred embodiments, the cut is a U-cut, and the electrical characteristic of interest (e.g., resistance) is measured during the second leg, and there is a transition from the second to the third leg at a predetermined characteristic value designed to achieve the desired value after cutting the third leg; the information used in cutting the first mentioned leg is in the form of length=$A|PRETEST|^B$, wherein A and B are constants determined by cuts associated with selected PRETEST (percentage difference between beginning and desired resistance) values and forced values of the desired end resistance, DRES; and the predetermined characteristic value is SRES, percentage of resistance less than desired resistance (DRES) at the end of the second leg, SRES being set equal to $A'|PRETEST|^{B'}$, wherein A' and B' are constants that also are determined by cuts of a component of the same geometry as the component being trimmed.

Other features and advantages of the invention will be apparent from the following description of the preferred embodiment thereof, and from the claims.

DESCRIPTION OF THE PREFERRED EMBODIMENT

STRUCTURE

Figure 1:
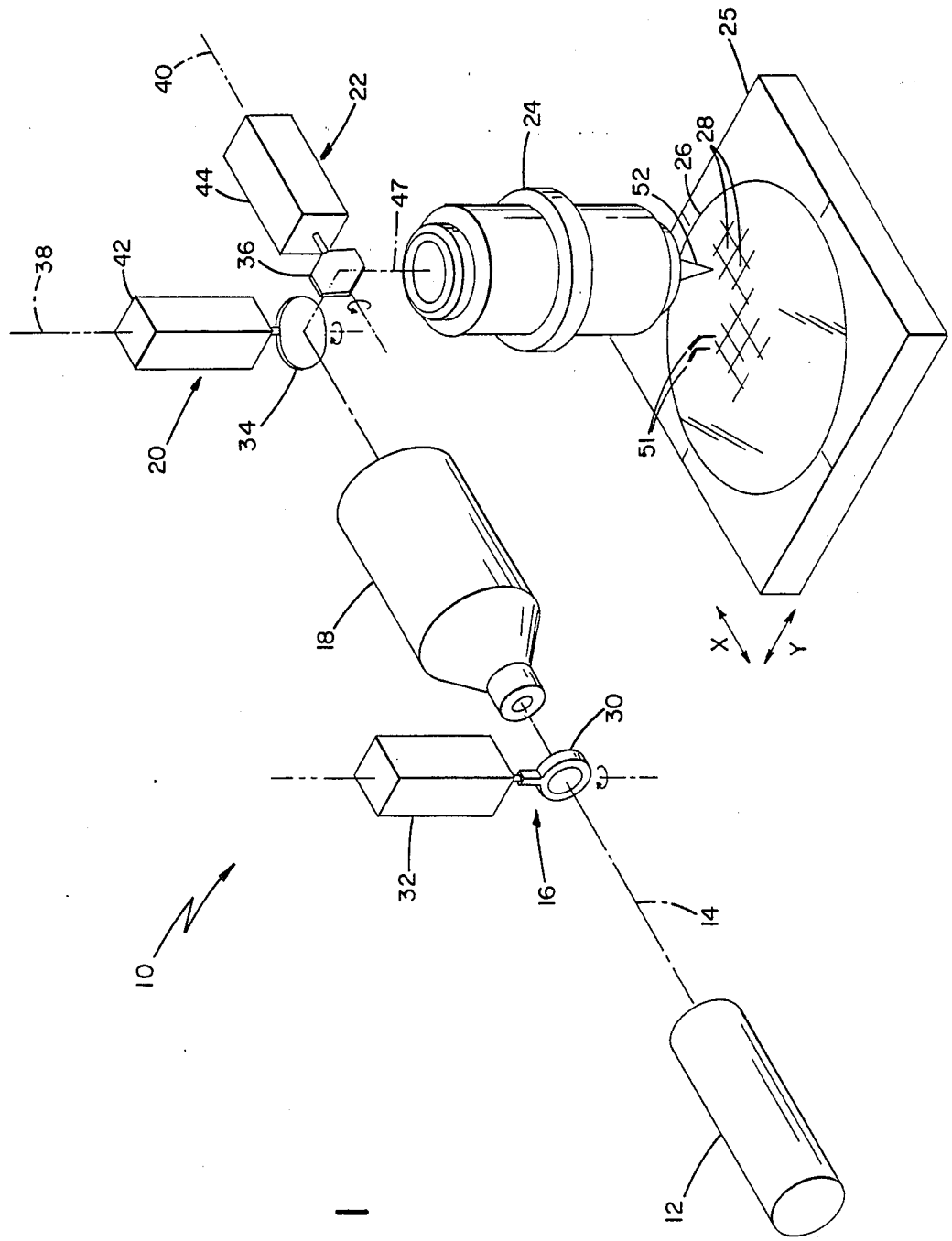
FIG. 1 is a diagrammatic perspective view of laser trimming apparatus according to the invention.

Referring to FIG. 1, there is shown laser trimming apparatus 10, the structure and operation of which is discussed in detail in U.S. Ser. No. 798,584, filed Nov. 15, 1985, entitled "Light Beam Positioning Apparatus", which is hereby incorporated by reference. Apparatus 10 includes neodymium YAG laser source 12 providing 1.06 micron beam 14, beam translator 16, beam expanding telescope 18, X-axis pivotal reflector 20, Y-axis pivotal reflector 22, telecentric scanning lens 24, and movable support 25 carrying substrate 26 carrying resistors 28. Beam translator 16 includes optically flat refracting element 30 (a flat piece of glass) pivotally mounted on galvanometer 32. Refracting element 30 is inclined in its mount with respect to the vertical perpendicular axis to beam 14, for the purpose mentioned below. Pivotal reflectors 20, 22 include mirrors 34, 36 mounted for pivoting about axes 38, 40 on galvanometers 42, 44 respectively. Apparatus 10 also includes probes 51 that are movably mounted (by means not shown) to contact electrodes 54 (FIG. 3) of a resistor 28 to measure resistance.

Figure 2:
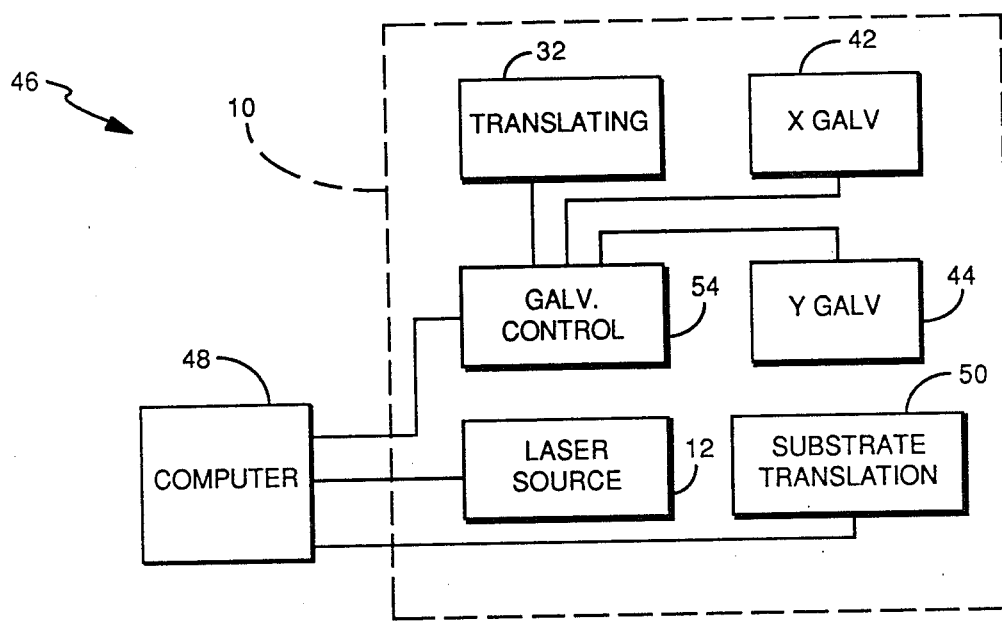
FIG. 2 is a block diagram of control components of the FIG. 1 laser trimming apparatus.

Referring to the simplified block diagram of FIG. 2 it is seen that trimming system 46 incorporating laser trimming apparatus 10 is controlled by external computer 48 and includes substrate translation mechanism 50, to make large movements of substrate 26 so that individual resistors 28 are moved into position for scanning by focused laser beam 52 (FIG. 1). Galvanometer control circuit 54 converts digital control signals into analog position signals for the galvanometers.

Figure 3:
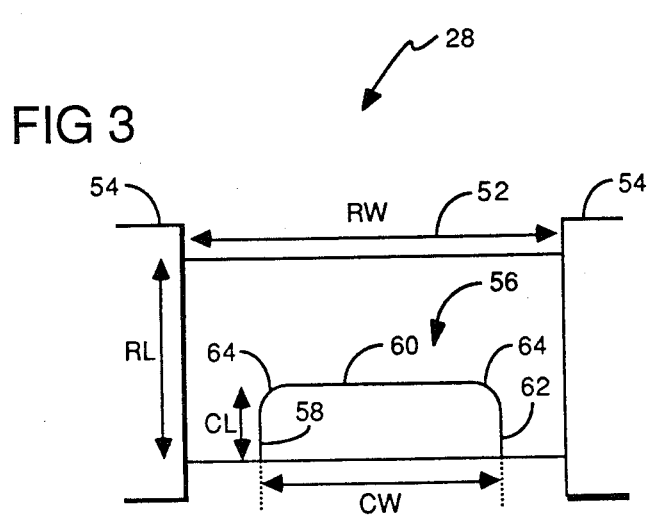
FIG. 3 is a diagrammatic plan view of a resistor trimmed by a U-cut made according to the invention.

Referring to FIG. 3, it is seen that a resistor 28 includes resistor material 52, connected to electrodes 54 and having width RW and length RL. Resistor material 52 has a U-shaped cut 56 in it made according to the invention. Cut 56 has first leg 58, second leg 60, third leg 62, and curved transitions or corners 64 between them. First and third legs 58, 62 have lengths of CL, and second leg 60 has a length of CW.

OPERATION

In general, after an initial characterization procedure, in which a data base is generated by trimming resistors 28 and measuring resulting resistance changes (as described in detail below), individual resistors 28 are trimmed by measuring initial resistance, RRES, and trimming so as to achieve desired resistance, DRES, which is higher than RRES.

In operation, a substrate 26 carrying resistors 28 to be trimmed by exposure to focused laser beam 52 is mounted on support 25. Substrate translation mechanism 50 moves individual resistors 28 on support 25 into alignment with telecentric scanning lens 24, and galvanometers 32, 42, 44 are used to quickly and accurately direct focused beam 52 to the particular resistor 28 being trimmed.

Galvanometer 42 pivots mirror 34 so that focused beam 52 moves in the X direction on wafer 26, and galvanometer 44 pivots mirror 36 so that focused beam 52 moves in the Y direction, all under control of computer 48. Depending on the pivotal position of mirror 34, galvanometer 32 adjusts refracting element 30 to laterally translate beam 14 the amount necessary so that it is reflected from mirror 34 to the center point 56 of pupil 45, as described in detail in the above-reference patent application.

The construction of the data base includes two steps, the first relating to changes in resistance resulting from changes in CL (the lengths of the first and third legs), the second relating to differences in resistance before and after cutting the third leg, used to control CW (the length of the second leg) during a cut. A parameter used in both steps is PRETEST, which is defined as the percentage difference between the measured resistance value, RRES, and the desired value, DRES, and is given by the following formula:

$$PRETEST = \frac{RRES - DRES}{DRES} \times 100$$

(Pretest thus is always negative for laser trimming.)

Figure 4:
FIG. 4 is a graph of the length of cut (CL) versus PRETEST function determined by and employed in controlling trimming by the FIG. 1 apparatus.

In the first step, the formula that describes the CL versus PRETEST function shown in FIG. 4 is generated by determining the CL values that result in the following PRETEST values, designated $\alpha$: $-3\%$, $-8\%$, $-13\%$, $-18\%$, $-23\%$, $-28\%$, $-33\%$, $-38\%$.

Figure 6:
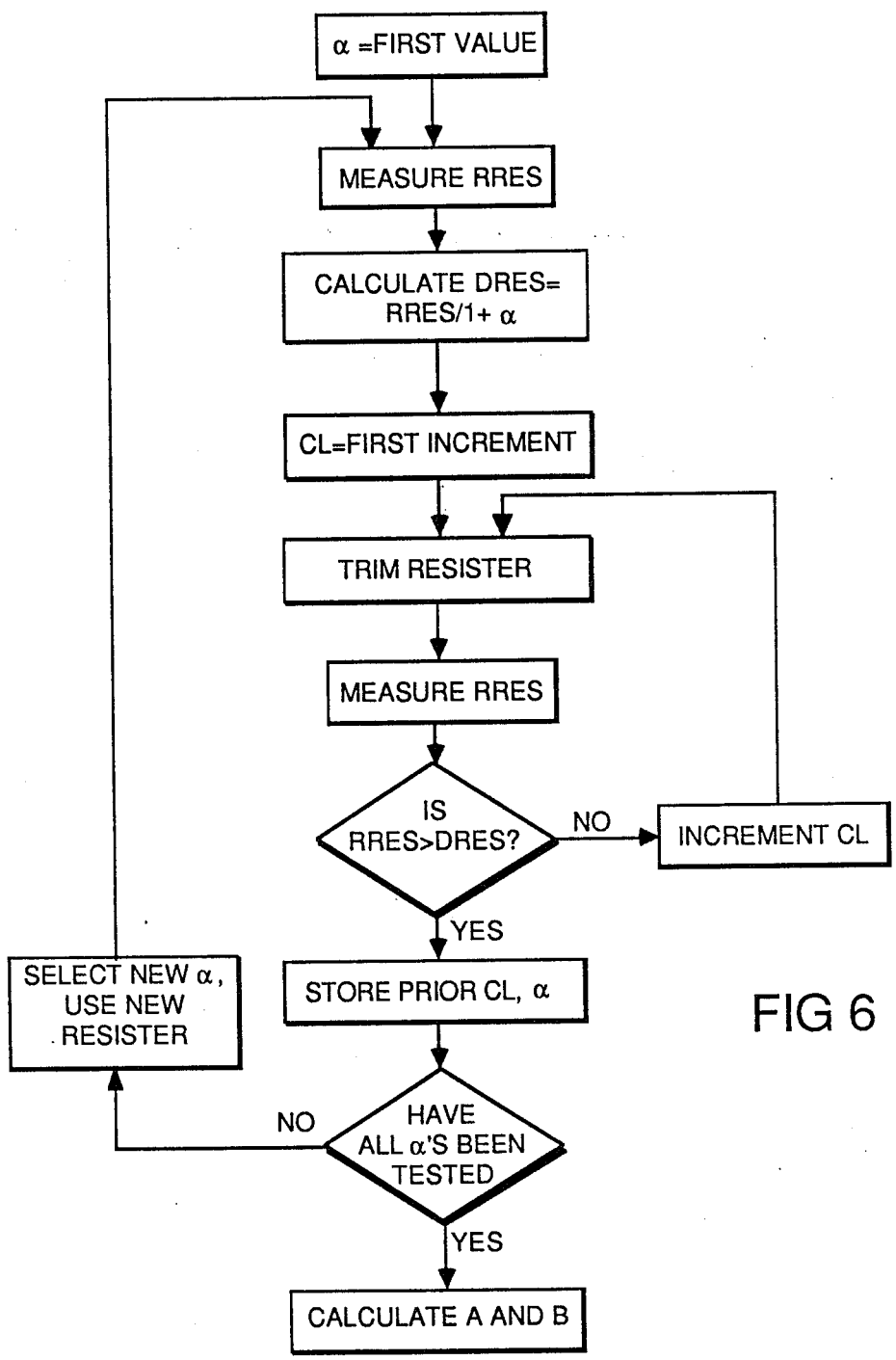
FIG. 6 is a flow diagram describing the method employed to obtain coefficients describing the FIG. 4 function.

Referring to FIG. 6, a different resistor is used for each value of $\alpha$. Probes 51 contact electrodes 54 of a resistor 28 to be trimmed, and its resistance, RRES, is measured. DRES is determined by the following formula.

$$DRES = \frac{RRES}{1 + \alpha}$$

This DRES value gives the final resistance value (after trimming a U-cut) associated with $\alpha$, given RRES. CW is set equal to 0.60 RW for the entire first step for small resistors (RW less than 100 mils) and to 0.833 RW for large resistors (RW greater than 100 mils). Resistor 28 is initially trimmed at the smallest step of CL permitted by the apparatus, and the resulting resistance RRES is measured and compared with DRES. This continues, CL being incremented by a step with each successive cut, until RRES is greater than DRES. The CL just prior to that cut is the largest cut that can be achieved, keeping the resistor value smaller than the value expected. That CL value provides a pair of data for the CL versus PRETEST function of FIG. 4.

A new resistor 28 (having the same geometry) is then used for the next $\alpha$ value and so on until all $\alpha \rightarrow$s have been used. The resulting eight-data data base, containing CL values for each $\alpha$, is then used to generate coefficients A and B in the following polynomial approximation of the CL versus PRETEST function:

$$CL = A|PRETEST|^B$$

In particular, linear regression of log CL versus log A plus B times log|PRETEST| is used with the eight data base values to obtain A and B.

Trimming using only the information of FIG. 4, varying only CL, results in precision of $\pm 3\%$ for small resistors. Accordingly varying of the length of the second leg, using the information of the second step described below, is also employed to provide greater precision.

Figure 5:
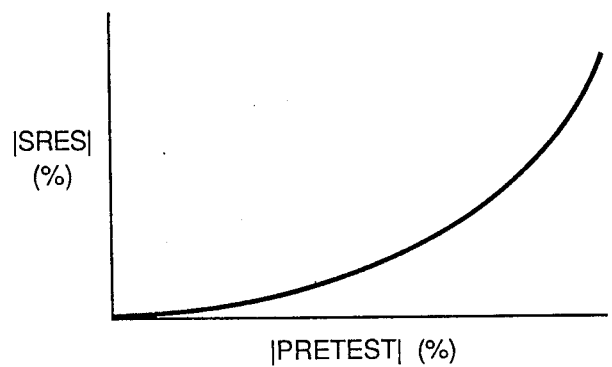
FIG. 5 is a graph of the SRES (% of resistance) versus PRETEST function determined by and employed in controlling the FIG. 1 apparatus.

In the second step the formula that describes the SRES versus PRETEST function of FIG. 5 is generated. SRES is the resistance value, RRES, at the end of the cut of the second leg that corresponds to a desired DRES after cutting the third leg. (Cutting the third leg causes e.g., a 2% further reduction in the resistance.) SRES is a percentage of DRES; e.g., an SRES of $-2\%$ means that cutting of the second leg ends when RRES is 98% of DRES.

Figure 7:
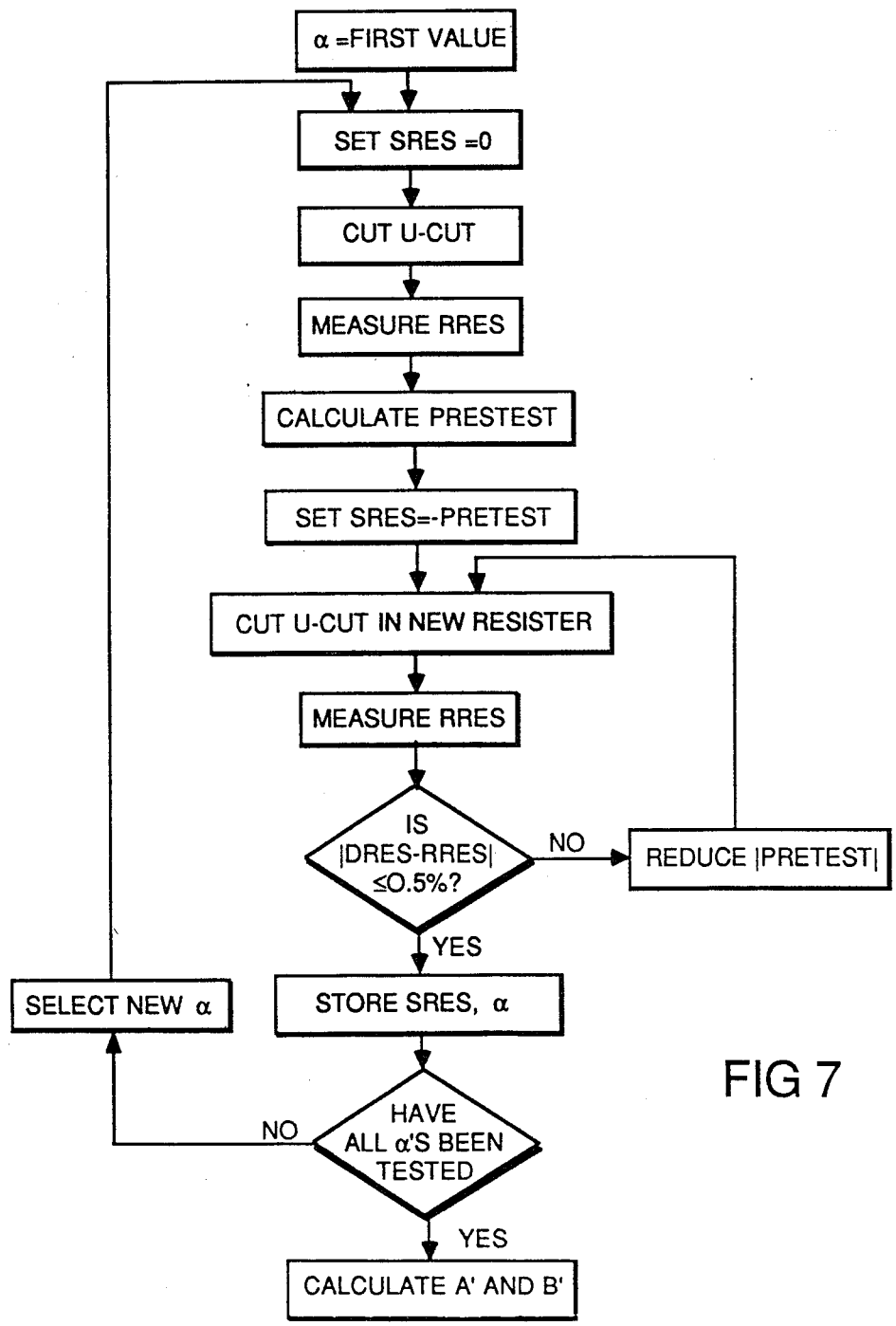
FIG. 7 is a flow diagram describing the method employed to obtain coefficients describing the FIG. 5 function.

Referring to FIG. 7, SRES is calculated for each value of $\alpha$ (and corresponding CL) by initially setting SRES equal to 0. (Thus the resistance after cutting the second leg is DRES.) The PRETEST value resulting after cutting the third leg (a positive number) thus relates to the difference in resistance caused by cutting the third leg. The negative of this PRETEST value is used as SRES in a subsequent cut at the same $\alpha$; if the resulting end resistance is $\pm 0.5\%$ of DRES, this SRES value is used for $\alpha$. If not, further cuts are made with SRES changed (made more negative if resulting PRETEST is positive or more positive if resulting PRETEST is negative) until the resulting measured resistance value is $\pm 0.5\%$ of DRES.

The same procedure is employed for the other $\alpha$ values, and the resulting data base is used to generate coefficients A' and B' in the following polynomial approximation of the SRES versus PRETEST function:

$$SRES = A'|PRETEST|^{B'}$$

The A, B, A' and B' coefficients just calculated are constants that will not be updated during a job involving the same geometry resistor material and DRES.

Figure 8:
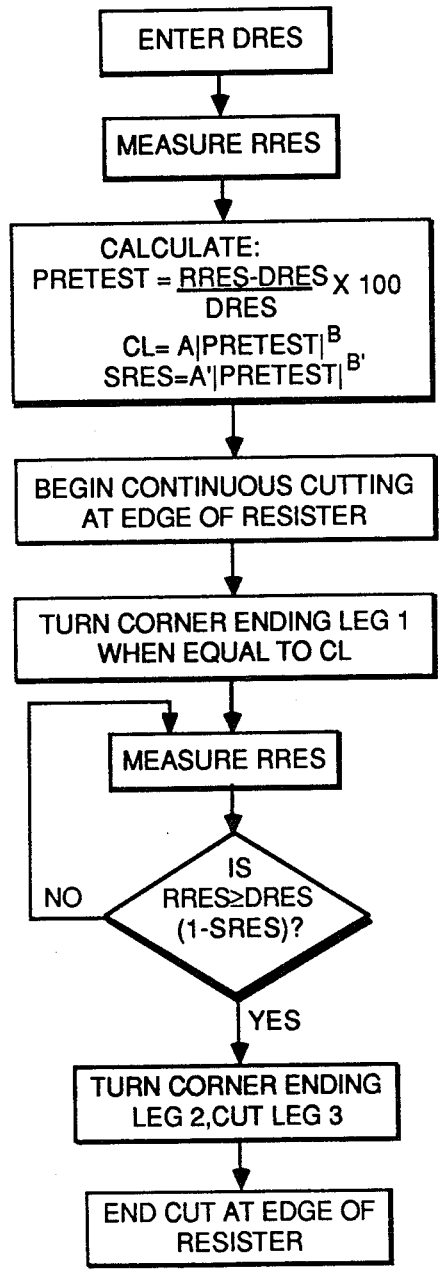
FIG. 8 is a flow diagram describing a method of trimming using the FIG. 1 apparatus.

Referring to FIG. 8, during actual trimming, as apparatus 46 trims individual resistors 28, it measures initial resistance RRES, employs A, B, A', B' to determine CL and SRES, and continuously cuts U-cut 60 without stopping, doing calculations on the fly. First leg 58 is cut for a distance of CL. During the cutting of second leg 60, RRES is continuously monitored and compared with (1-SRES) times DRES. When RRES equals (or first exceeds) this value, apparatus 46 begins cutting of the third leg, with the resistance resulting at the end of the third leg being close to DRES.

Other Embodiments

Other embodiments of the invention are within the scope of the following claims. E.g., the invention could be employed with electrical components other than resistors and in trimming to achieve electrical characteristics other than resistance (e.g., voltage, frequency, or some other characteristic dependent upon trimming). Also, instead of the three galvanometer/telecentric scanning lens system described above, a two galvanometer/nontelecentric scanning system could be used.

What is claimed is:

1. A method of laser trimming an electronic component to achieve a desired electronic characteristic comprising entering into a controller the desired value of said characteristic of said component being trimmed, measuring the beginning value of said characteristic of said component being trimmed, determining the value of the length of a first leg of cut of said component by reference to information based upon cuts of legs of different lengths of a component of the same geometry as the component being trimmed, and cutting said component being trimmed using said laser to obtain said first leg of said cut.

2. The method of claim 1 wherein said first leg is the first leg of a U-cut having first, second, and third legs, and further comprising determining a predetermined characteristic value for terminating cutting of said second leg of said cut to achieve the desired characteristic value after cutting said third leg.

3. The method of claim 1 wherein said component is a resistor.

4. The method of claim 3 wherein said characteristic is resistance.

5. The method of claim 4 wherein said information is the length of said leg as a function of PRETEST.

6. The method of claim 5 wherein said information is in the form of length equals $A|\text{PRETEST}|^B$, wherein A and B are constants determined by cuts associated with selected PRETEST values and forced DRES values.

7. The method of claim 2 wherein said component is a resistor.

8. The method of claim 7 wherein said predetermined characteristic value relates to SRES, percentage of resistance less than desired resistance, DRES, at the end of said second leg.

9. The method of claim 8 wherein SRES equals $A'|\text{PRETEST}|^{B'}$, wherein A' and B' are constants determined by cuts of components of the same geometry as the component being trimmed.

10. A method of laser trimming a U-cut having first, second, and third legs in a resistor to achieve a desired end resistance after cutting said third leg comprising entering into a controller the desired value of said end resistance of said resistor being trimmed, measuring the beginning resistance of said resistor being trimmed, determining a predetermined resistance value for terminating said second leg to achieve said desired end resistance value, and cutting said second leg while measuring said resistance until the measured value equals the predetermined resistance value and then ending said leg.

11. The method of claim 10 wherein said predetermined value relates to SRES, percentage of resistance less than desired resistance, DRES, at the end of said second leg.

12. The method of claim 11, wherein SRES equals $A'|\text{PRETEST}|^{B'}$, wherein A' and B' are constants determined by cuts of components of the same geometry as the component being trimmed.

* * * * *